United States Patent [19]
Leftwich

[11] Patent Number: 5,771,815
[45] Date of Patent: Jun. 30, 1998

[54] COLLAPSIBLE TABLE FOR MOTOR VEHICLE

[75] Inventor: William B. Leftwich, Elkhart, Ind.

[73] Assignee: Glaval Corporation, Elkhart, Ind.

[21] Appl. No.: 773,653

[22] Filed: Dec. 24, 1996

Related U.S. Application Data

[60] Provisional application No. 60/011,039 Feb. 2, 1996.
[51] Int. Cl.[6] .................................................. A47B 57/00
[52] U.S. Cl. ............................... 108/99; 108/115; 108/44
[58] Field of Search ............................... 108/115, 99, 92, 108/42, 44, 45, 145

[56] References Cited

U.S. PATENT DOCUMENTS

| | | | |
|---|---|---|---|
| 544,821 | 8/1895 | Morrison | 108/99 X |
| 1,955,769 | 4/1934 | Reynolds | 108/99 X |
| 2,530,231 | 11/1950 | Detweiler | 108/99 X |
| 2,657,810 | 11/1953 | Garrick | 108/42 X |
| 2,927,702 | 3/1960 | Deusen, Jr. et al. | 108/99 X |
| 4,194,452 | 3/1980 | Crowther et al. | 108/99 X |
| 5,069,142 | 12/1991 | Matre | 108/115 X |

FOREIGN PATENT DOCUMENTS 309163  11/1955  Switzerland ........................ 108/115

*Primary Examiner*—Jose V. Chen
*Attorney, Agent, or Firm*—Baker & Daniels

[57] ABSTRACT

A collapsible table for use on motor vehicles such as conversion vans, motorhomes and other recreational vehicles. The collapsible table of the present invention is mounted to the floor of the vehicle and includes a lower frame, an intermediate frame pivotally attached to the lower frame, and an upper frame pivotally attached to the intermediate frame. Both the intermediate frame and the upper frame pivot between a folded position in which the frame is next to its adjacent frame and an extended position in which each frame is spaced from its adjacent frame. The collapsible table includes a latch mechanism for latching the frames in their folded or extended positions. Accordingly, a table surface attached to the upper frame can be placed in a lower position adjacent the floor, an intermediate positions, and a raised position. The lower frame of the collapsible table includes slotted mounting brackets designed to mount to the standard base plate used to mount passenger seating to the floor of vehicles, which allows the table to be placed in a variety of locations throughout the vehicle.

30 Claims, 11 Drawing Sheets

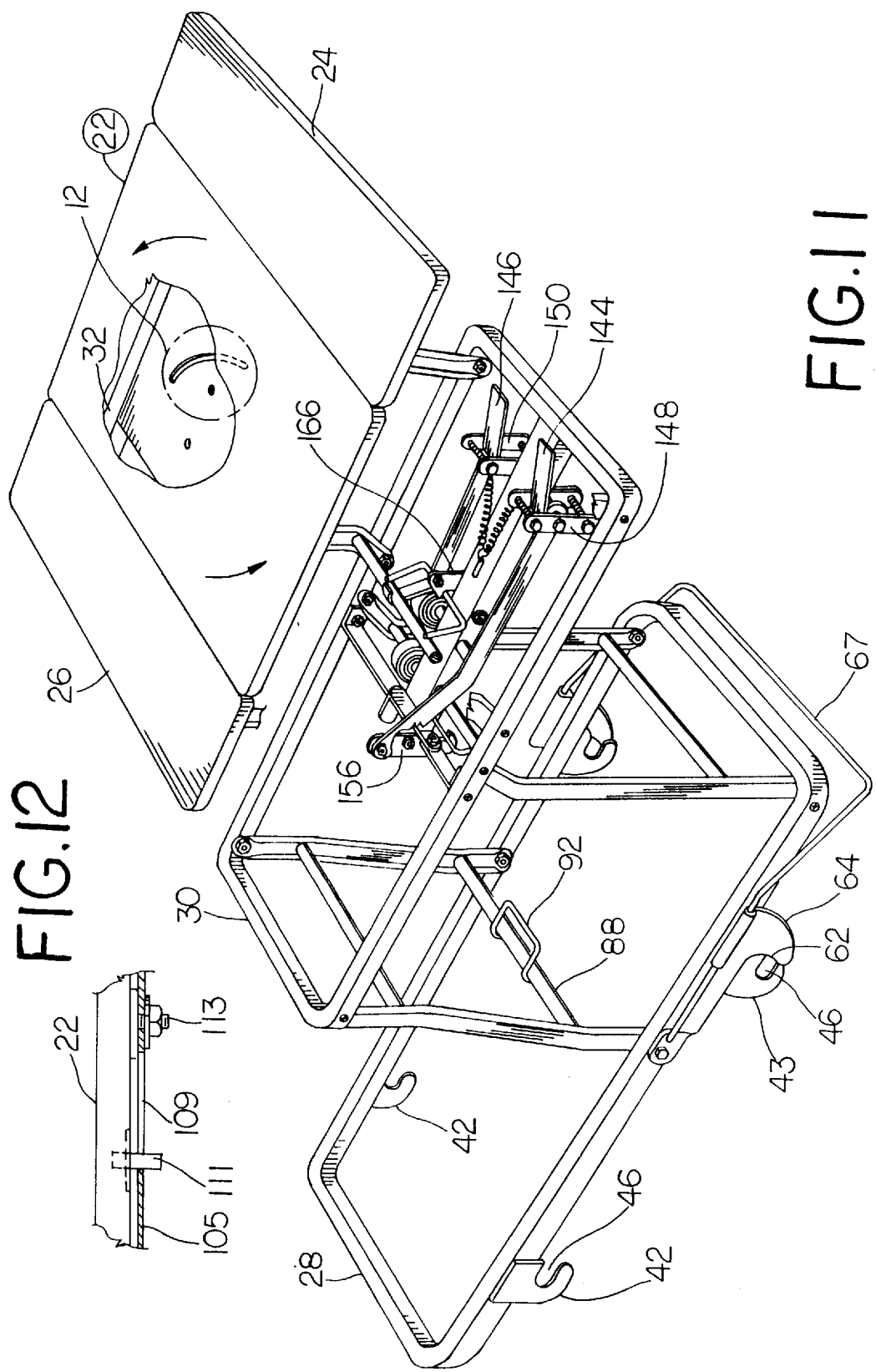

COLLAPSIBLE TABLE FOR MOTOR VEHICLE

This application claims domestic priority based on earlier filed Provisional Patent Application, Ser. No. 60/011,039 filed Feb. 2, 1996. The present invention relates to a collapsible table for motor vehicles, such as a conversion vans, motor homes, or similar vehicles.

BACKGROUND AND SUMMARY OF THE INVENTION

Passenger vehicles which permit at least some of the occupants to ride facing one another and have access to a common table have become increasingly popular. However, while it is desirable that a table be quickly and easily brought to a position in which it can be used for eating, playing games, etc. during travel, it is equally desirable that the table be quickly and easily folded out of the way to facilitate entry into, and exit from, the vehicle.

The present invention relates to a collapsible table for use in motor vehicles, such as conversion vans, motorhomes, or other recreational vehicles. When not in use, the table is stored in a compact folded position against the floor of the vehicle. The table can be easily raised to an intermediate stage in which the table can be used as a drink holder or other purposes. The table can also be raised to a fully upright stage in which the table can be positioned so it is accessible to all passengers in the mid and rear portion of the vehicle.

The table of the present invention is adapted for mounting on the same standard mounting plate that is commonly used to mount passenger seating in the vehicles described above. Accordingly, the table can be removed from the vehicle when the vehicle is to be used to transport cargo instead of passengers, and because the table employs the same mounting plate, the table can be mounted in any one of many different positions within the vehicle.

The present invention also includes a rotatable and expandable table top having folding leaves. With the leaves folded, the table is narrow enough to fit between adjacent seats when the table is in the fully collapsed or the intermediate position. With the table raised, the leaves unfolded, and the top rotated, the table provides a substantial amount of surface area for eating, card playing, or other activities.

Accordingly, it is an object of this invention to provide a collapsible table for a motor vehicle that can be quickly and easily installed in a number of locations within the vehicle.

It is another object of this invention to provide a collapsible table for a motor vehicle that mounts to the standard mounting plate commonly used to mount passenger seats in motor vehicles.

It is another object of this invention to provide a table for a motor vehicle that can be placed in a fully collapsed position, an intermediate position, and a raised position.

These and other objects of the invention will become readily apparent to those skilled in the art upon a reading of the following description.

BRIEF DESCRITION OF THE DRAWINGS

DETAILED DESCRIPTION OF THE INVENTION

Figure 1:
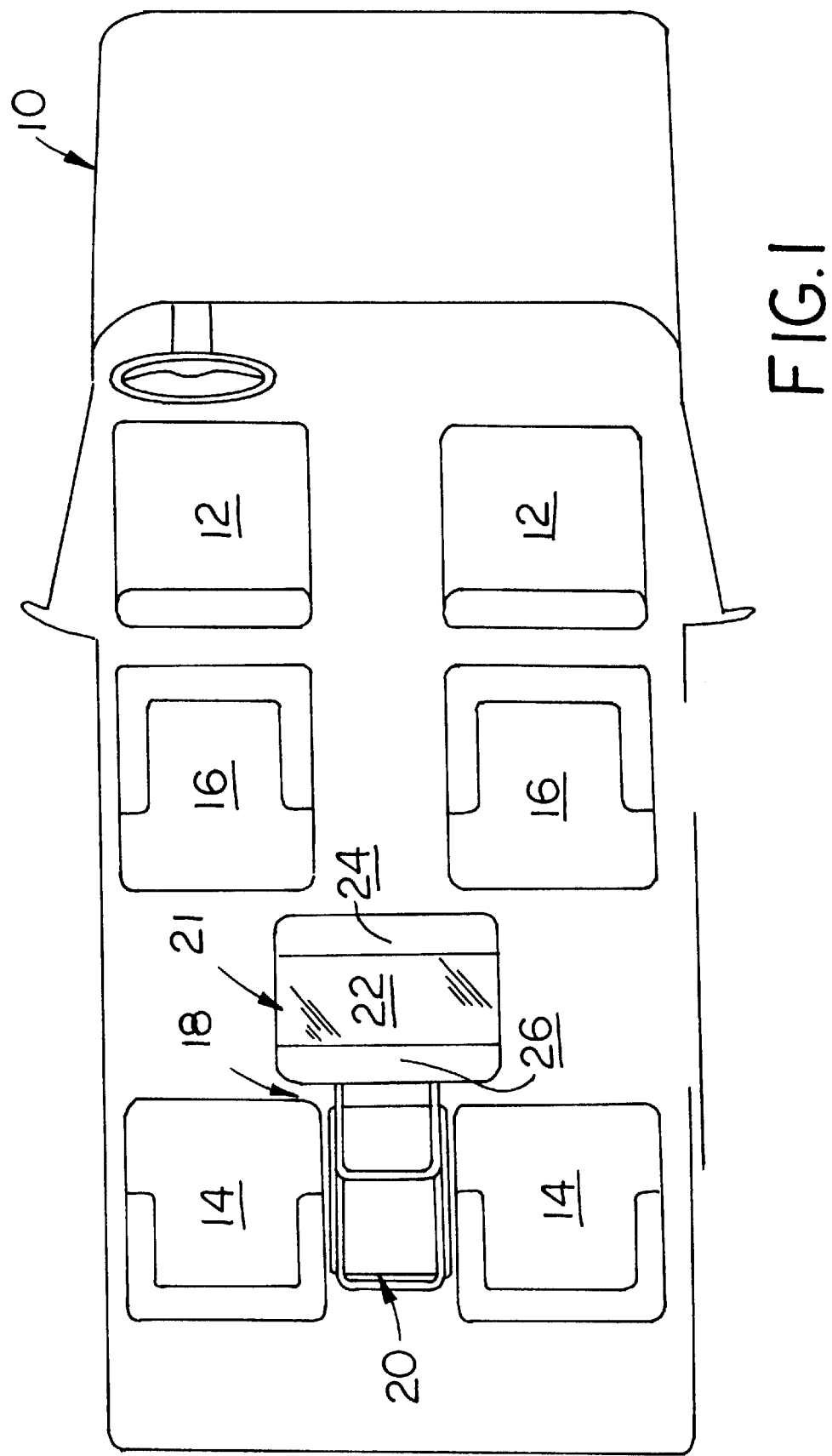
FIG. 1 is a top plan view of the interior of a motor vehicle, illustrating the seating arrangement.

Referring now to FIG. 1, a vehicle 10 is provided with front seats 12, forward facing rear seats 14 and rearward facing rear seats 16, which are mounted between the front seats 12 and the rear seats 14. Typically, seats 16 are reversible. A collapsible table made pursuant to the teachings of the present invention is generally indicated by the numeral 18, and is shown installed between the forward facing rear seats 14. However, as will hereinafter be explained, the table 18 mounts on a floor mounting plate of generally the same design as the floor mounting plate used to mount the seats 14 and 16; accordingly, the table 18 can be mounted in place of any of the seats 14, 16. The table 18 includes a supporting structure 20 and a working surface 21 including a center portion 22 and a pair of leaves 24, 26 which are hingedly connected to the center portion 22 by hinges 27.

The support structure 20 includes a lower frame generally indicated by the numeral 28, an intermediate frame generally indicated by the numeral 30 and an upper frame generally indicated by the numeral 32. The lower frame 28 includes a pair of side members 34, 36 interconnected by end members 38, 40. A pair of slotted feet 42, 43 are mounted on side member 34, and a pair of slotted feet 44, 45 are mounted on side member 36. Each of the feet 42, 43, 44 and 45 define an open ended aperture 46 thereon. The feet 42, 43, 44 and 45 are received in recesses 48, 50 and 58, 60 of a base plate 52 which is permanently installed on the floor of the vehicle 10 by, for example, bolts or welded cross pins extending through apertures (not shown). When the support structure is to be installed on the base plate 52, the feet 42–45 are installed in the recesses 48, 50, and 58, 60 and the entire support structure slides relative to the base plate 52 to thereby engage the apertures 46 with retaining pins 56 which extend transversely across the recesses 48, 50, 58 and 60. The lower frame 28 is retained on the base plate 52 by the engagement of camming surfaces 62 defamed on lever arms 64, 66 which are pivotally mounted to side members 34, 36 respectively. The lever arms 64, 66 are interconnected by a U-shaped handle 67, which can be operated to pivot the lever arms 64, 66 to engage the camming surfaces 62 carried thereby with the pins 56 within the recesses 58, 60, thereby securing the lower frame 28 to the base plate 52.

Figure 5:
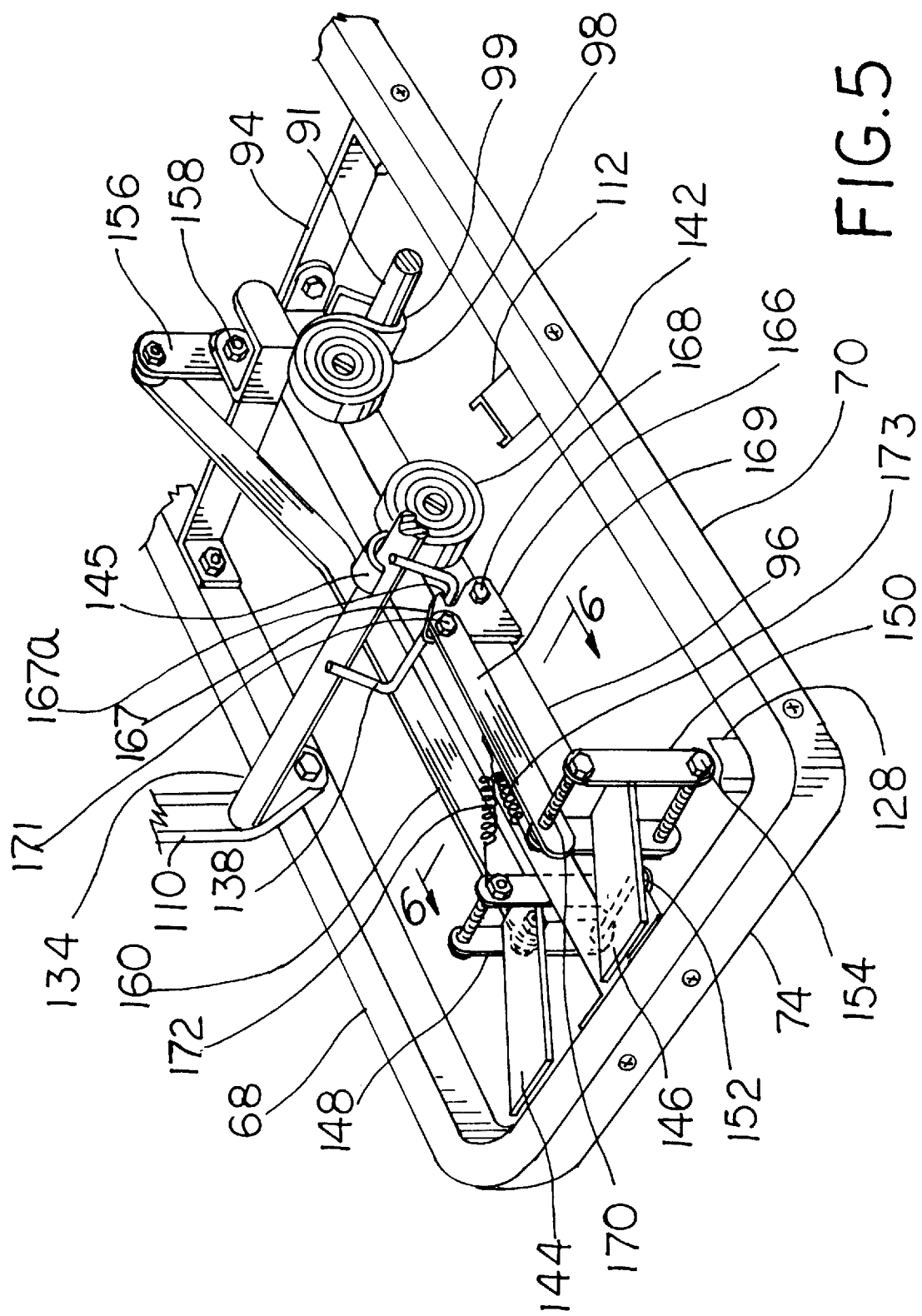
FIG. 5 is an enlarged fragmentary view in perspective of the intermediate frame showing the locking mechanism of the present invention as well as the springs used to raise and lower the frames.
Figure 6:
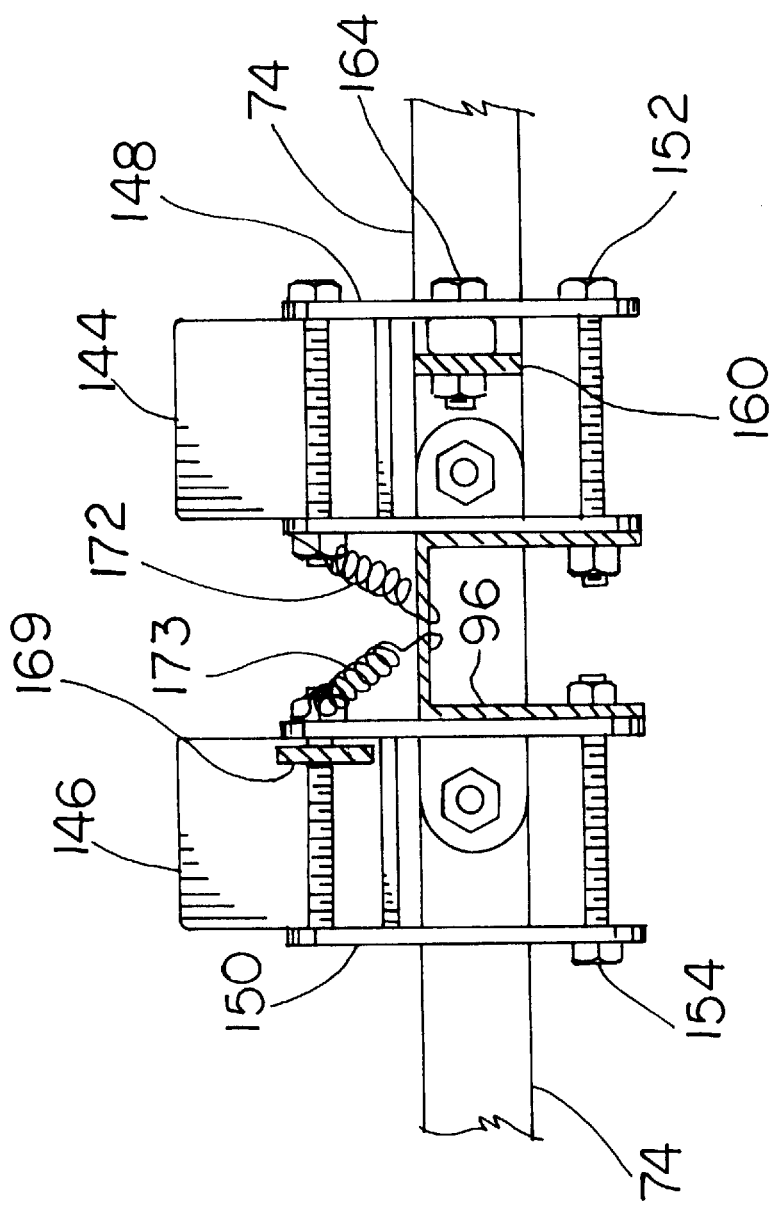

The intermediate frame 30 includes a pair of side members 68, 70 interconnected by end members 72, 74. Pivots 76, 78 pivotally connect a first pair of legs 80, 82 to the side members 68, 70, and another pair of pivots 84, 86 pivotally connect the legs 80, 82 to side members 34, 36 of the lower frame 28. Pivots 77, 79 pivotally connect a second pair of legs 81, 83 to side members 68, 70, and another pair of pivots 85, 87 connect legs 81, 83 to side members 34, 36 of lower frame 38. Cross braces 88, 90 connect legs 80, 82, while cross braces 89, 91 connect legs 81, 83. A loop or catch 92 is connected to cross brace 88 between the legs 80 and 82, and another loop or catch 93 is connected to cross brace 91 between legs 81, 83. Intermediate frame 30 further includes a center member 94 which extends between the intermediate portions of side members 68, 70, and further includes center support or strut 96 that extends between end member 74 and center member 94. A wound spring 98 is mounted on strut 96 and includes an arm 99 bearing against the cross-brace 91 as shown in FIG. 5, thereby biasing the frame 30 into the upper position illustrated in FIG. 2. As will be hereinafter explained, spring 98 is wound as the frame 30 is lowered into the lowered position illustrated in FIG. 7, and unwinds to exert a biasing counter-balancing force yieldably urging the frame 30 to the upper position illustrated in FIGS. 2 and 8.

Upper frame 32 includes a pair of side members 100, 102 and a pair of interconnecting end members 104, 106. Table mounting plate 105 is connected between the intermediate portions of side members 100, 102, and includes table mounting hole 107 and arcuate guide slot 109. Table 18 is mounted to plate 105 by a pivot 113, and a guide pin or peg 111 on the underside of table 18 fits within guide slot 109 as can be seen in FIGS. 11 and 12. Accordingly, the table 18 can be rotated from a position illustrated in FIG. 10 in which the table runs substantially parallel to the longer dimension of the upper frame 32, permitting the support structure 20 to be collapsed into the lowered position illustrated in FIG. 7 or expanded into the fully erect position illustrated in FIGS. 9 and 10. Once in the fully erect position of FIG. 10, the work surface 21 can be rotated into the position illustrated in FIG. 11, permitting easy access to the table by passengers seated in seats 14 and/or 16. The leaves can then be opened by pivoting about hinges 27.

Figure 7:
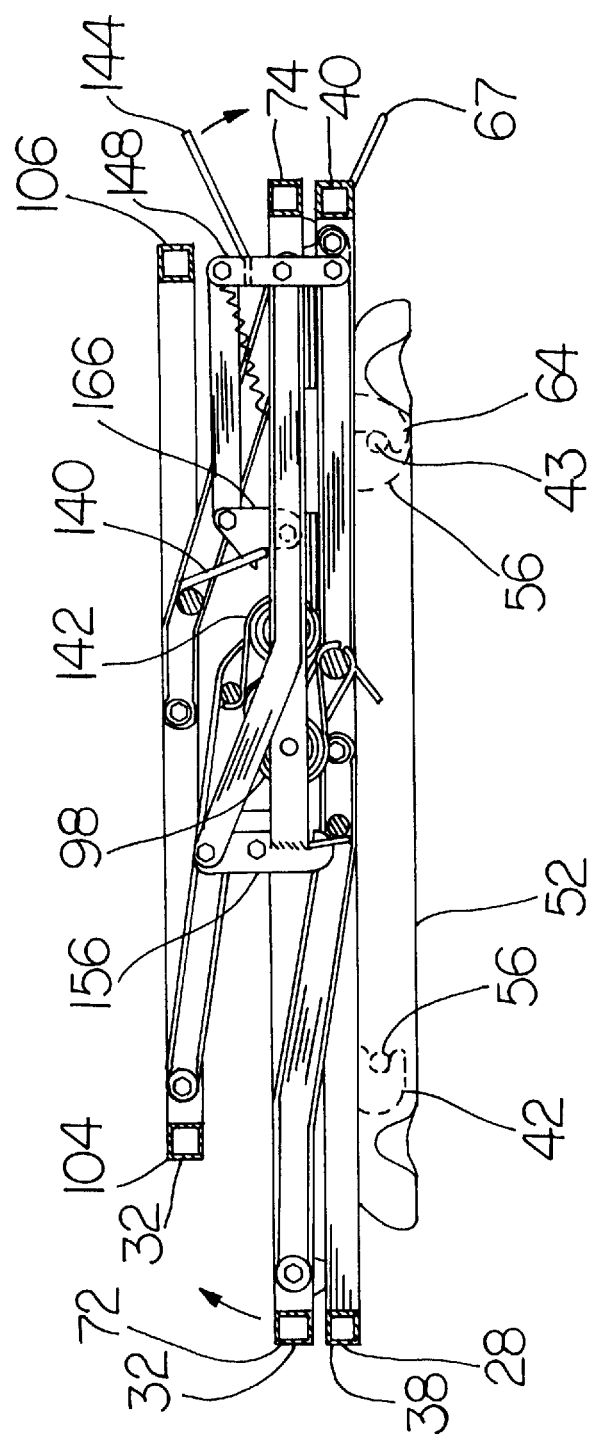
Figure 8:
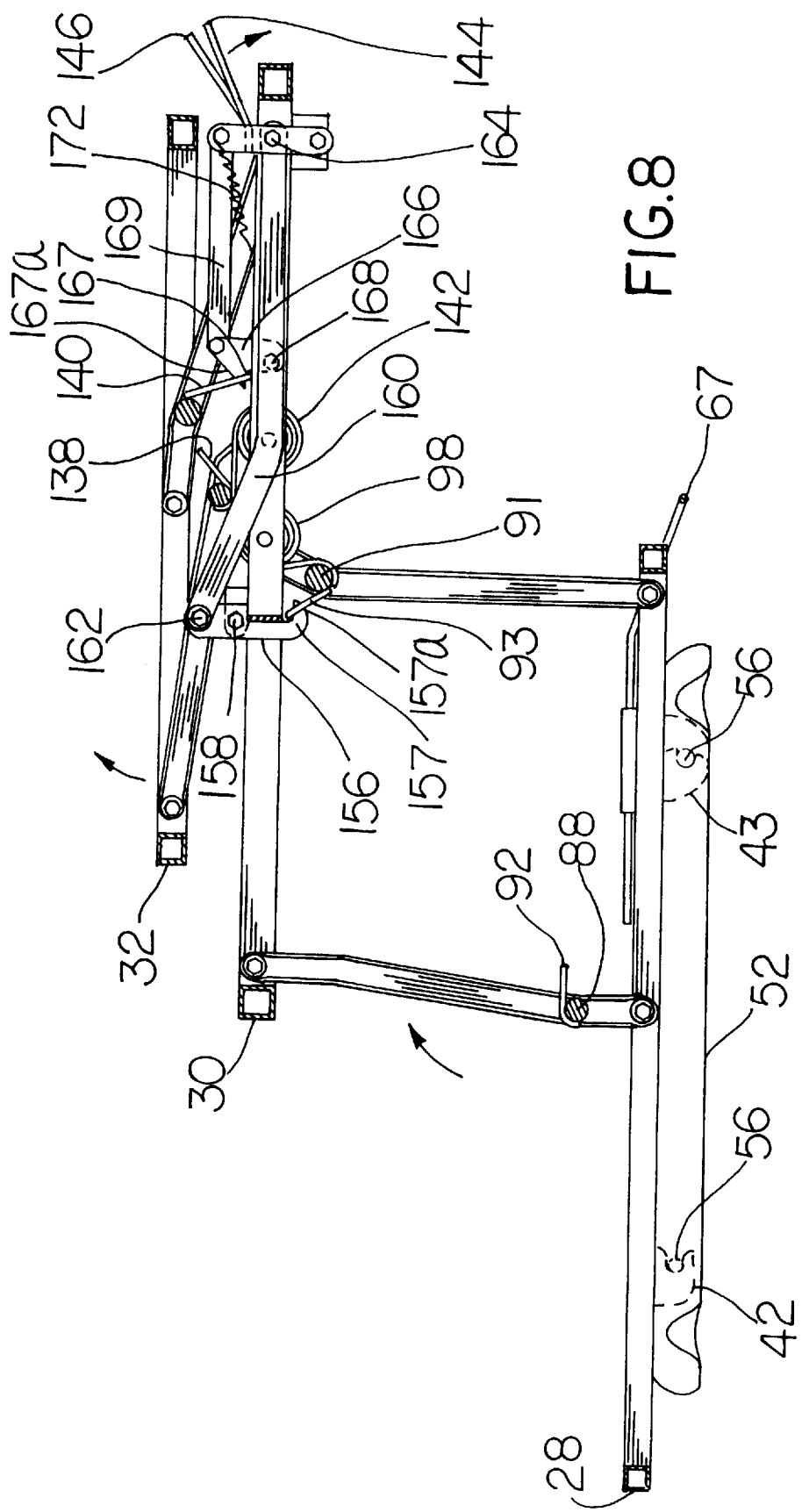
Figure 9:
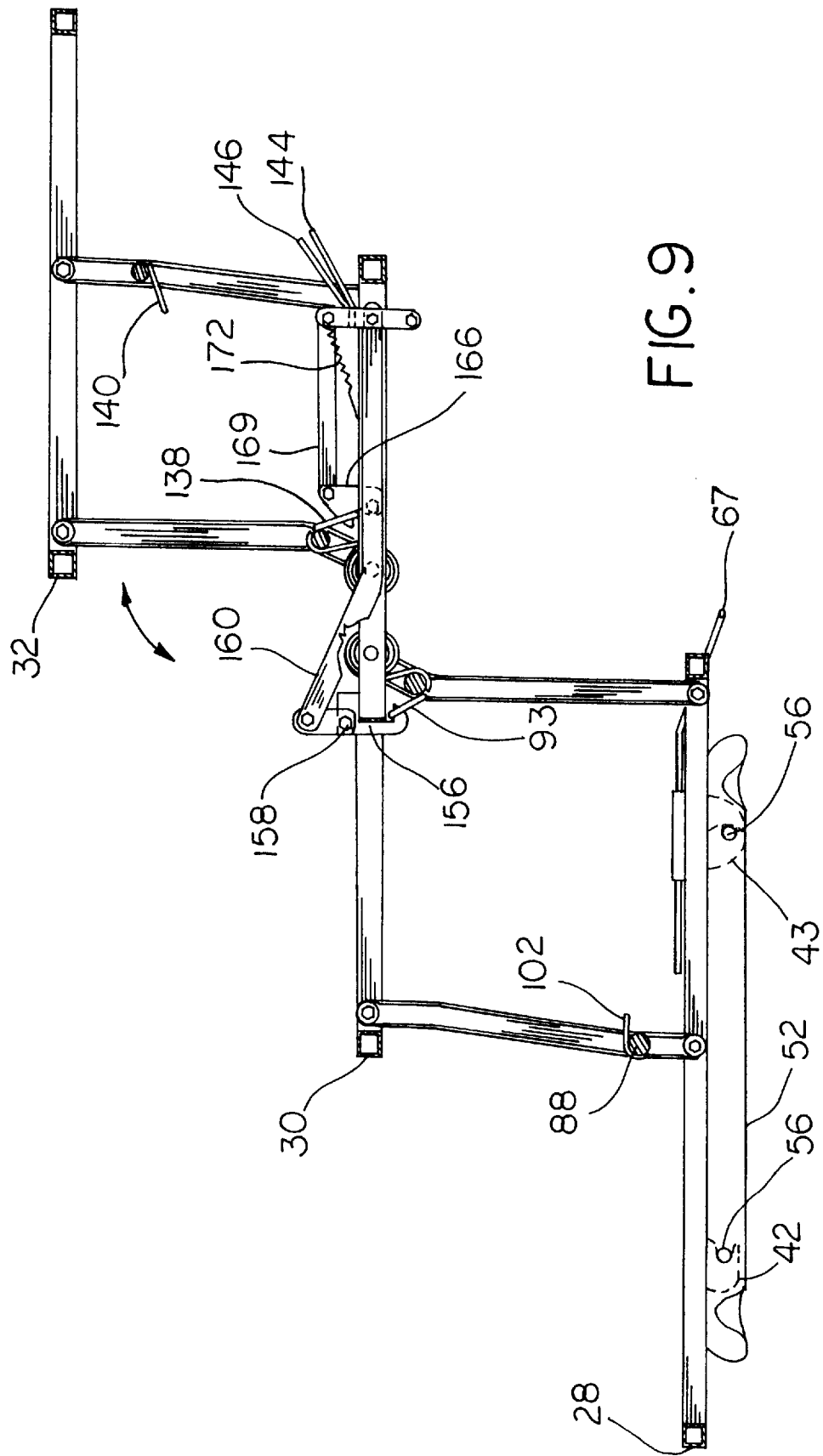
Figure 10:
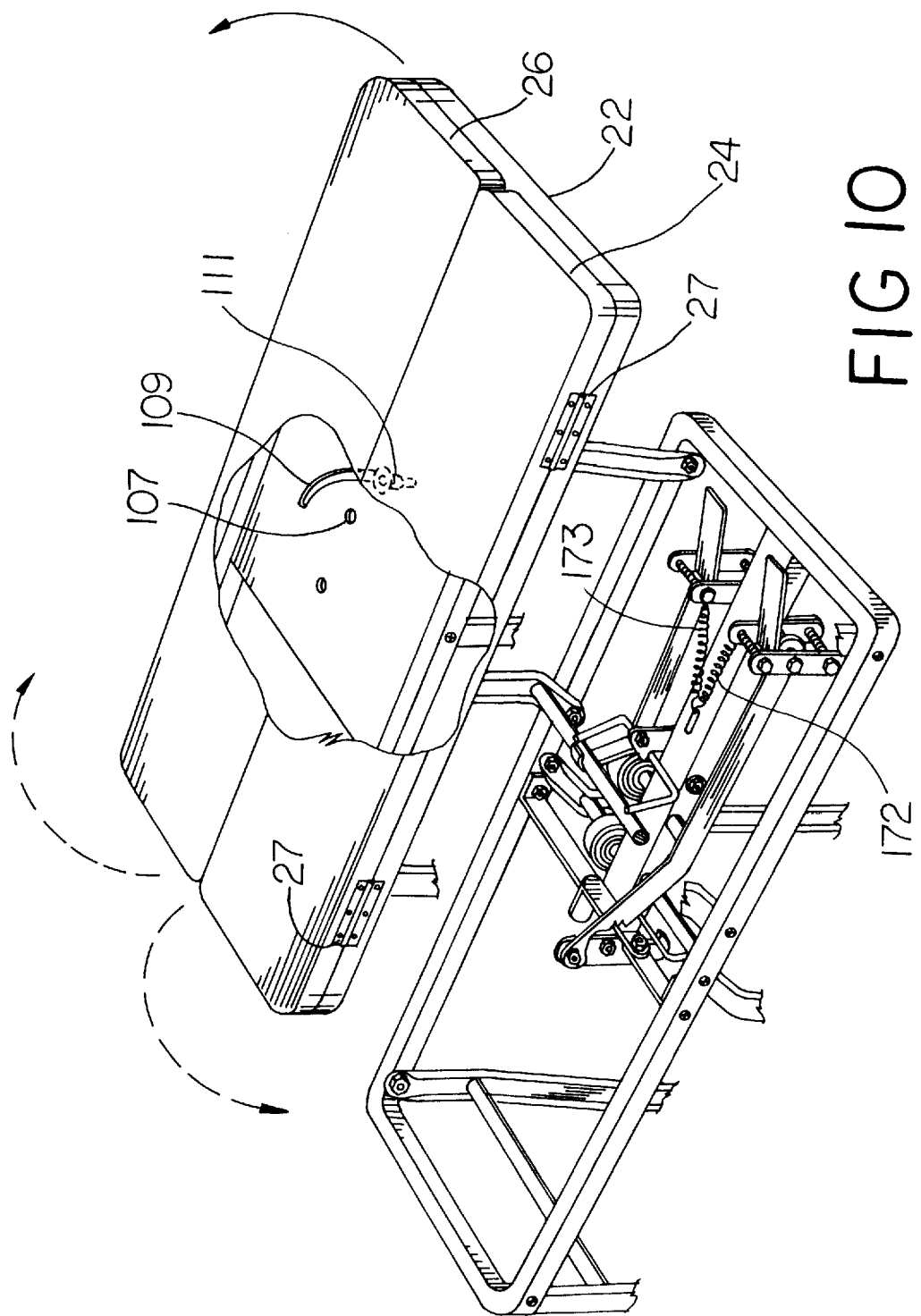

Upper frame 32 is supported on intermediate frame 30 by a first pair of legs 110, 112, and pivots 114, 116 pivotally connect legs 110, 112 to side members 100, 102, and another pair of pivots 118, 120 pivotally connect the legs 110, 112 to side members 68, 70 of intermediate frame 30. Pivots 122, 124 pivotally connect a second pair of legs 126, 128 to side members 100, 102, and another pair of pivots 130, 132 connect legs 126, 128 to side members 68, 70 of intermediate frame 30. Cross braces 134, 135 connect legs 110, 112, while cross brace 136 connects legs 126, 128. A loop or catch 138 is connected to cross brace 134 between legs 110, 112, and another loop or catch 140 is connected to cross brace 136 between legs 126, 128 as can be seen in FIGS. 7, 8 and 9. A wound spring 142 is mounted on strut 96 and includes an arm 145 bearing against the cross-brace 134, thereby biasing the frame 32 into the upper position illustrated in FIGS. 2 and 9. As will be hereinafter explained, spring 142 is wound as the frame 32 is lowered into the lowered position illustrated in FIG. 8, and unwinds to exert a biasing counter-balancing force yieldably urging the frame 32 to the upper position illustrated in FIGS. 2 and 9.

Figure 3:
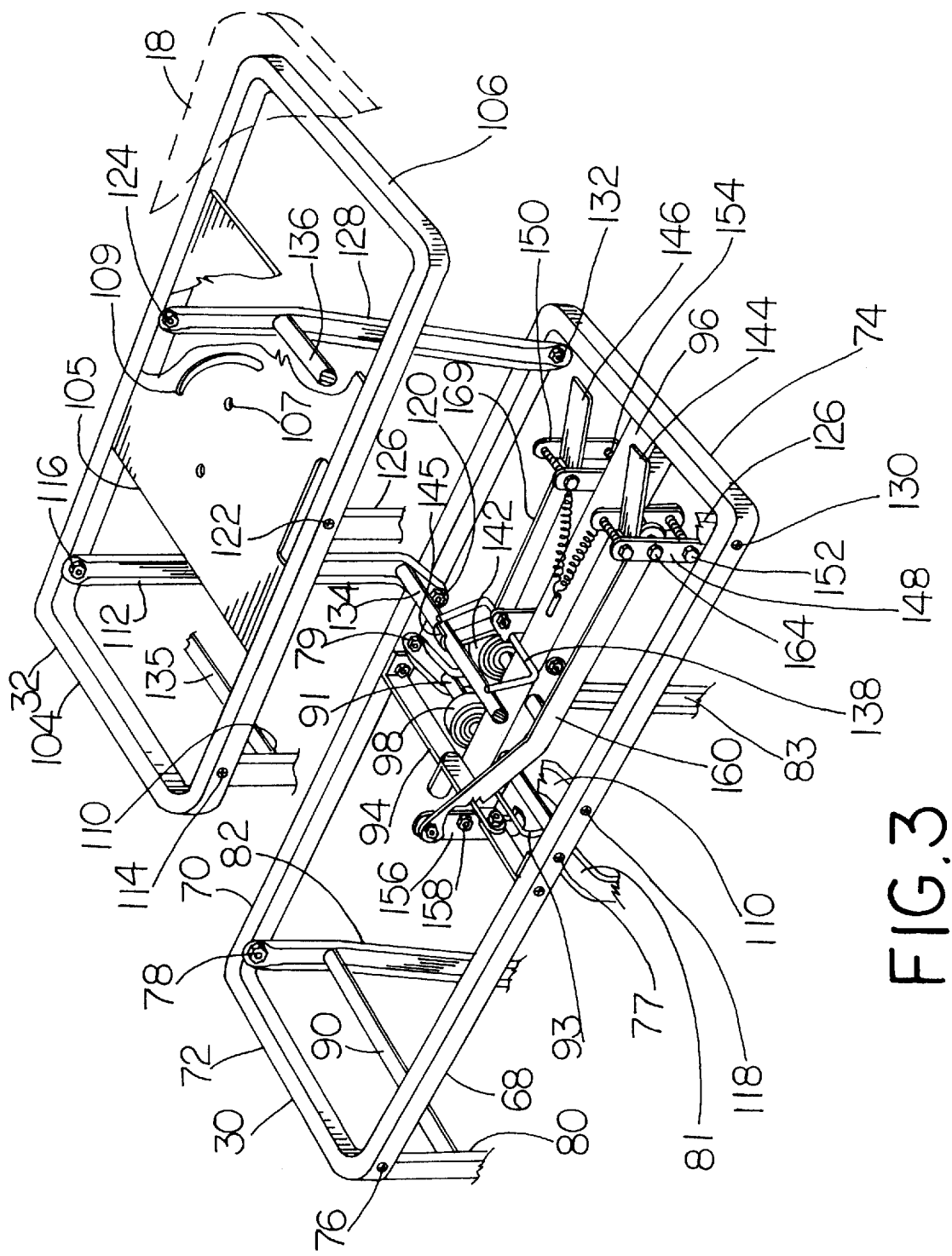
FIG. 3 is a fragmentary view in perspective of the collapsible table of the present invention shown with its upper frame in its raised or extended position spaced part from the intermediate frame, and showing the locking mechanism used to lock both moveable frames in their extended positions.
Figure 4:
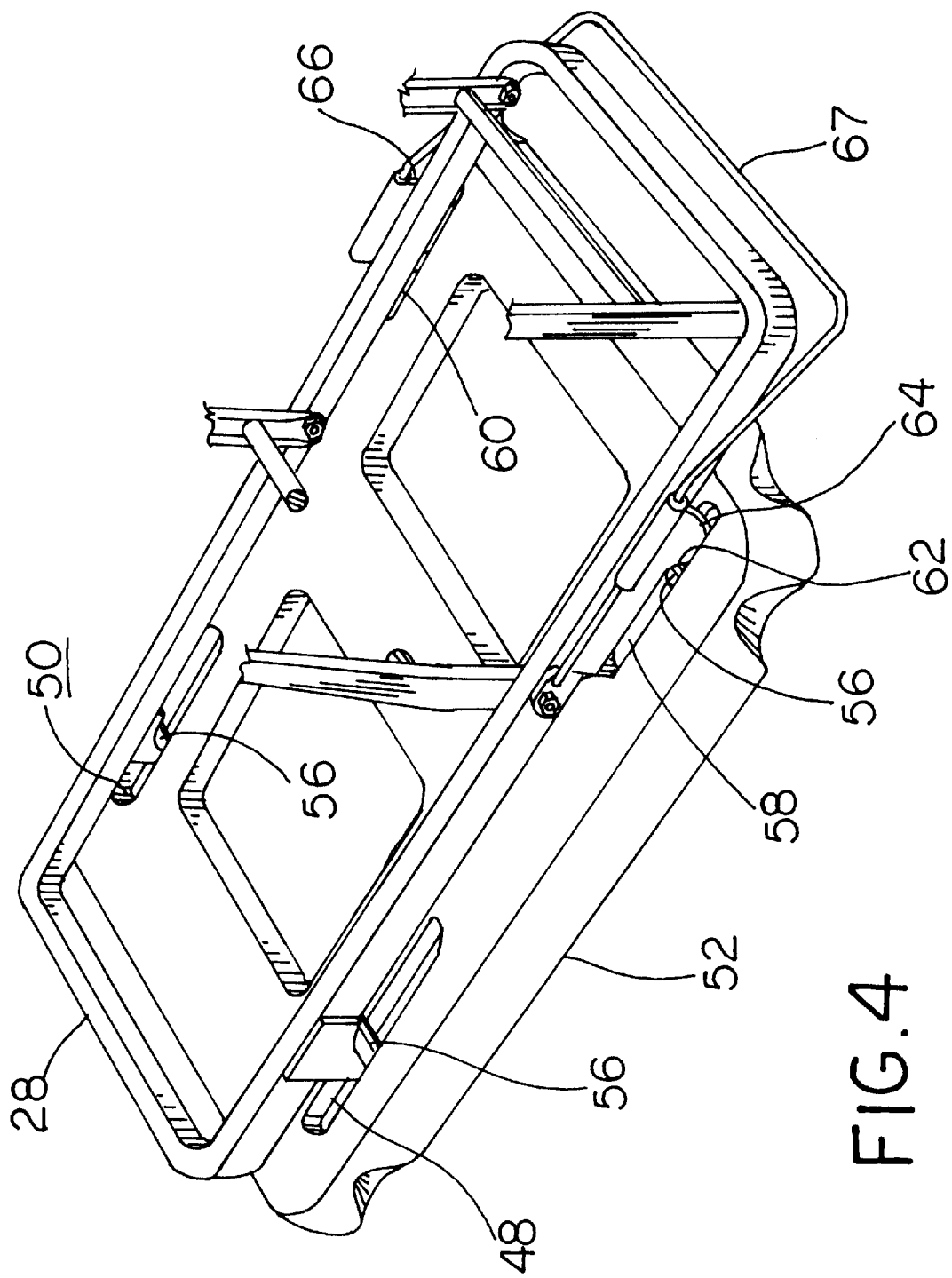
FIG. 4 is a fragmentary view in perspective of the lower frame shown secured to the mounting plate which is typically permanently secured to the floor of a motor vehicle.

As shown in FIG. 3, a lower actuation lever 144 and an upper actuation lever 146 are rigidly mounted to shackles or arms 148, 150, respectively, and arms 148, 150 are pivotally supported on center strut 96 by pivots 152, 154, respectively. Latch 156 is mounted to center member 94 by pivot 158, and the lower end of latch 156 includes hook 157 with lower camming surface 157a, the function of which is explained in greater detail below. Arm 160 is mounted to upper end of latch 156 by pivot 162, and pivot 164 connects arm 160 to arms 148, enabling lower lever 144 to move latch 156 as described below. Latch 166 is mounted to strut 96 by pivot 168, and the upper end of latch 166 includes hook 167 with upper camming surface 167a. Arm 169 extends between latch 166 and arms 150, and includes pivots 170 and 171, so that upper lever 146 can move latch 166 as described in greater detail below. Springs 172, 173 connect arms 148, 150, respectively to strut 96, and exert a biasing force yieldably urging the upper ends of arms 148, 150 towards the left when viewing FIGS. 8 and 9.

Figure 2:
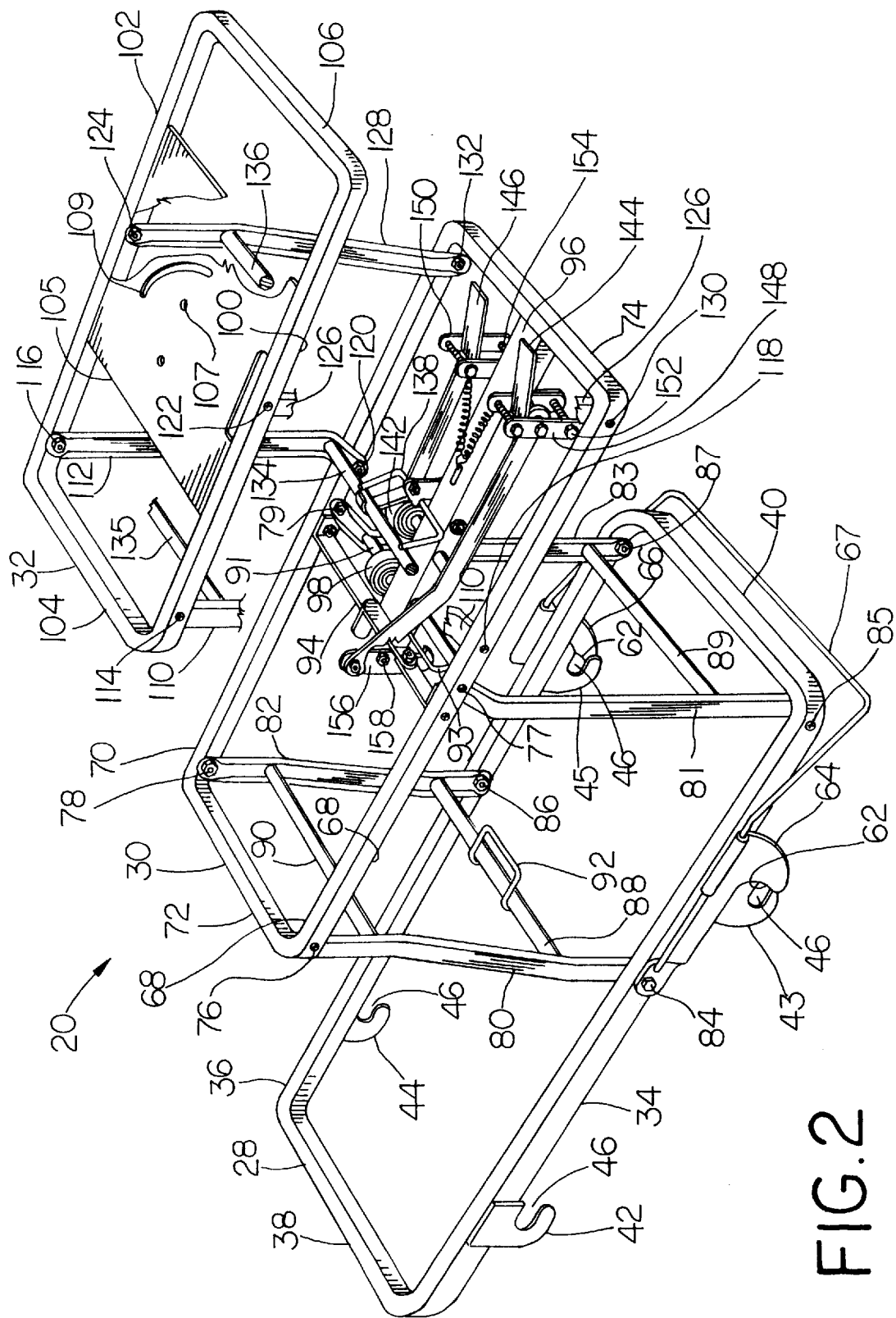
FIG. 2 is a fragmentary view in perspective illustrating the lower frame, the intermediate frame, and the upper frame of the collapsible table, with both the intermediate frame and the upper frame in their extended positions.

In operation, when it is desired to collapse the support structure 20 from the fully erect position illustrated in FIGS. 2 and 9 into the collapsed position illustrated in FIG. 7, the operator actuates in any sequence levers 144, 146. For example, in order to unlock the upper frame 32 and lower the frame to a position adjacent intermediate frame 30, the operator pushes down on lever 146, which causes hook 167 on latch 166 to become disengaged from catch 138. Upper frame 32 can then be folded towards intermediate frame 30, until the camming surface 167a of hook 167 comes into contact with catch 140, which causes hook 167 to pivot and subsequently engage catch 140, thus locking upper frame 32 adjacent intermediate frame 30. Spring 173 maintains hook 167 in contact with catch 140. Similarly, in order to unlock the intermediate frame 30 and lower the frame to a position adjacent lower frame 28, the operator pushes down on lever 144, which causes hook 157 on latch 156 to become disengaged from catch 93. Intermediate frame 30 can then be folded towards lower frame 28, until camming surface 157a of hook 157 comes into contact with catch 92, which causes hook 157 to pivot and subsequently engage catch 92. Spring 172 then maintains hook 157 in contact with catch 92.

To raise the frames to their extended positions the process is simply reversed. For example, to raise intermediate frame 30 to its extended position, lever 144 is depressed which causes hook 157 to become disengaged from catch 92, and the force of spring 98 urges intermediate frame 30 to its extended position. As intermediate frame 30 approaches the extended position, camming surface 157a contacts catch 93, which pivots latch 156 until hook 157 with the assistance of spring 172 engages catch 93. To raise upper frame 32 to its extended position, lever 146 is depressed which causes hook 167 to become disengaged from catch 140, and the force of spring 142 urges upper frame 32 to its extended position. As upper frame 32 approaches the extended position, catch 138 contacts camming surface 167a, which pivots latch 166 until hook 167 with the assistance of spring 173 engages catch 138.

It will be appreciated that the foregoing is presented by way of illustration only, and not by way of any limitation, and that various alternatives and modifications may be made to the illustrated embodiment without departing from the spirit and scope of the invention.

What is claimed:

1. Collapsible table for a motor vehicle, comprising:

a lower frame;

an intermediate frame pivotally attached to said lower frame, said intermediate frame being shiftable between a folded position parallel and adjacent to said lower frame and an extended position parallel and spaced from said lower frame;

an upper frame pivotally attached to said intermediate frame, said upper frame being shiftable between a folded position parallel and adjacent to said intermediate frame and an extended position parallel and spaced from said intermediate frame;

latch means for locking the support surface carried by said upper frame in a lower position, an intermediate position, a raised position, said latch means including means for locking said intermediate frame in the folded position and in the extended position and for locking said upper frame in the folded position and in the extended position.

2. The table of claim 1, wherein said upper frame is connected to said intermediate frame by an upper subframe, said upper subframe being pivotally attached to said upper frame and said intermediate frame, and wherein said intermediate frame is connected to said lower frame by a lower subframe, said lower subframe being pivotally attached to said intermediate frame and said lower frame.

3. The table of claim 2, wherein said upper subframe includes an upper folded catch for engagement by said latch means when said upper frame is in said folded position, and an upper extended catch for engagement by said latch means when said upper frame is in said extended position, and wherein said lower subframe includes a lower folded catch for engagement by said latch means when said intermediate frame is in said folded position, and includes a lower extended catch for engagement by said latch means when said intermediate frame is in said extended position.

4. The table of claim 3, wherein each of said upper and lower subframes includes a pair of side legs and a cross brace extending between said side legs, one of said upper subframe cross braces carrying said upper folded catch and the other of said upper subframe cross braces carrying said upper extended catch, and one of said lower subframe cross braces carrying said lower folded catch and the other of said lower subframe cross braces carrying said lower extended catch.

5. The table of claim 4, including an upper spring in contact with said upper subframe for yieldably urging said upper frame towards said extended position, and further including a lower spring in contact with said lower subframe for yieldably urging said intermediate frame towards said extended position.

6. The table of claim 5, wherein each of said springs are wound coil springs.

7. The table of claim 2, wherein said latch means includes an upper hook for engaging said upper subframe for latching said upper frame in its folded position, said upper hook also for engaging said upper subframe for latching said upper frame in its extended position, said latch means further including a lower hook for engaging said lower subframe for latching said intermediate frame in its folded position, said lower hook also for engaging said lower subframe for latching said intermediate frame in its extended position, each of said hooks being pivotally mounted to said intermediate frame.

8. The table of claim 7, wherein said upper hook and said lower hook each include a camming surface for contact with said subframes for pivoting each of said hooks to a subframe receiving position upon contact with said subframes when either of said upper frame or said intermediate frame are shifted between there said folded and extended positions.

9. The table of claim 3, wherein said latch means includes an upper hook for engaging said upper folded catch and said upper extended catch when said upper frame is in said folded position and said extended position, respectively, and further including a lower hook for engaging said lower folded catch and said lower extended catch when said intermediate frame is in said folded position and said extended position, respectively.

10. The table of claim 9, wherein said latch means further includes an upper lever pivotally mounted to said intermediate frame and connected to said upper hook for disengaging said upper hook from said catch upon movement of said upper lever, and further including a lower lever pivotally mounted to said intermediate frame and connected to said lower hook for disengaging said lower hook from said catch upon movement of said lower lever.

11. The table of claim 9, wherein said latch means further includes a spring connected to said upper and lower hooks for yieldably maintaining said upper hook in engagement with said upper folded catch or said upper extended catch and for yieldably maintaining said lower hook in engagement with said lower folded catch or said lower extended catch.

12. The table of claim 1, including bias means carried by said intermediate frame for biasing said upper frame and said intermediate frame towards their respective extended positions.

13. The table of claim 1, including a plate carried by said upper frame for securing a support surface to said upper frame, and a support surface mounted to said plate.

14. The table of claim 13, wherein said plate includes an arcuate guide slot and said support surface includes a pivot and a guide pin engaging said slot, thereby permitting said support surface to be pivoted between a number of positions constrained by said slot.

15. The table of claim 1, wherein a mounting plate is adapted to be secured to a floor of a motor vehicle, said lower frame and said mounting plate including means releasably securing said lower frame to the mounting plate.

16. Collapsible table for a motor vehicle, comprising:

a lower frame an intermediate frame pivotally attached to said lower frame, said intermediate frame being shiftable between a folded position parallel and adjacent to said lower frame and an extended position parallel and spaced from said lower frame;

an upper frame pivotally attached to said intermediate frame, said upper frame being shiftable between a folded position parallel and adjacent to said intermediate frame and an extended position parallel and spaced from said intermediate frame;

an upper latch means for locking said upper frame in said folded and extended positions; and a lower latch means for locking said intermediate frame in said folded and extended positions, thereby permitting the support surface carried by said upper frame to be latched in a lower position, an intermediate position, and a raised position.

17. The table of claim 16, wherein said upper frame is connected to said intermediate frame by an upper subframe, said upper subframe being pivotally attached to said upper frame and said intermediate frame, and wherein said intermediate frame is connected to said lower frame by a lower subframe, said lower subframe being pivotally attached to said intermediate frame and said lower frame.

18. The table of claim 17, wherein said upper subframe includes an upper folded catch for engagement by said upper latch when said upper frame is in said folded position, and an upper extended catch for engagement by said upper latch when said upper frame is in said extended position, and wherein said lower subframe includes a lower folded catch for engagement by said lower latch when said intermediate frame is in said folded position, and includes a lower extended catch for engagement by said lower latch when said intermediate frame is in said extended position.

19. The table of claim 18, wherein each of said upper and lower subframes includes a pair of side legs and a cross brace extending between said side legs, one of said upper subframe cross braces carrying said upper folded catch and the other of said upper subframe cross braces carrying said upper extended catch, and one of said lower subframe cross braces carrying said lower folded catch and the other of said lower subframe cross braces carrying said lower extended catch.

20. The table of claim 19, including an upper spring carried by said intermediate frame and in contact with said upper subframe for yieldably urging said upper frame towards said extended position, and further including a lower spring carried by said intermediate frame and in contact with said lower subframe for yieldably urging said intermediate frame towards said extended position.

21. The table of claim 20, wherein each of said springs are wound coil springs.

22. The table of claim 18, wherein said upper latch includes an upper hook for engaging said upper folded catch and said upper extended catch when said upper frame is in said folded position and said extended position, respectively, and wherein said lower latch includes a lower hook for engaging said lower folded catch and said lower extended catch when said intermediate frame is in said folded position and said extended position, respectively.

23. The table of claim 22, wherein said upper latch further includes an upper lever pivotally mounted to said intermediate frame and connected to said upper hook for disengaging said upper hook from said catch upon movement of said upper lever, and further including a lower lever pivotally mounted to said intermediate frame and connected to said lower hook for disengaging said lower hook from said catch upon movement of said lower lever.

24. The table of claim 22, including a return spring connected to each of said upper and lower hooks for yieldably maintaining said upper hook in engagement with said upper folded catch or said upper extended catch and for yieldably maintaining said lower hook in engagement with said lower folded catch or said lower extended catch.

25. The table of claim 17, wherein said upper latch includes an upper hook for engaging said upper subframe for latching said upper frame in its folded position, said upper hook also for engaging said upper subframe for latching said upper frame in its extended position, and wherein said lower latch includes a lower hook for engaging said lower subframe for latching said intermediate frame in its folded position, said lower hook also for engaging said lower subframe for latching said intermediate frame in its extended position, each of said hooks being pivotally mounted to said intermediate frame.

26. The table of claim 25, wherein said upper hook and said lower hook each include a camming surface for contact with said subframes for pivoting each of said hooks to a subframe receiving position upon contact with said subframes when either of said upper frame or said intermediate frame are shifted between there said folded and extended positions.

27. The table of claim 16, including an upper spring and a lower spring carried by said intermediate frame for biasing said upper frame and said intermediate frame, respectively, towards their respective extended positions.

28. The table of claim 16, including a plate carried by said upper frame for securing a support surface to said upper frame, and a support surface mounted to said plate.

29. The table of claim 28, wherein said plate includes an arcuate guide slot and said support surface includes a pivot and a guide pin engaging said slot, thereby permitting said support surface to be pivoted between a number of positions constrained by said slot.

30. The table of claim 16, wherein a mounting plate is adapted to be secured to a floor of a motor vehicle, said lower frame and said mounting plate including means releasably securing said lower frame to the mounting plate.

* * * * *